Figure 1:
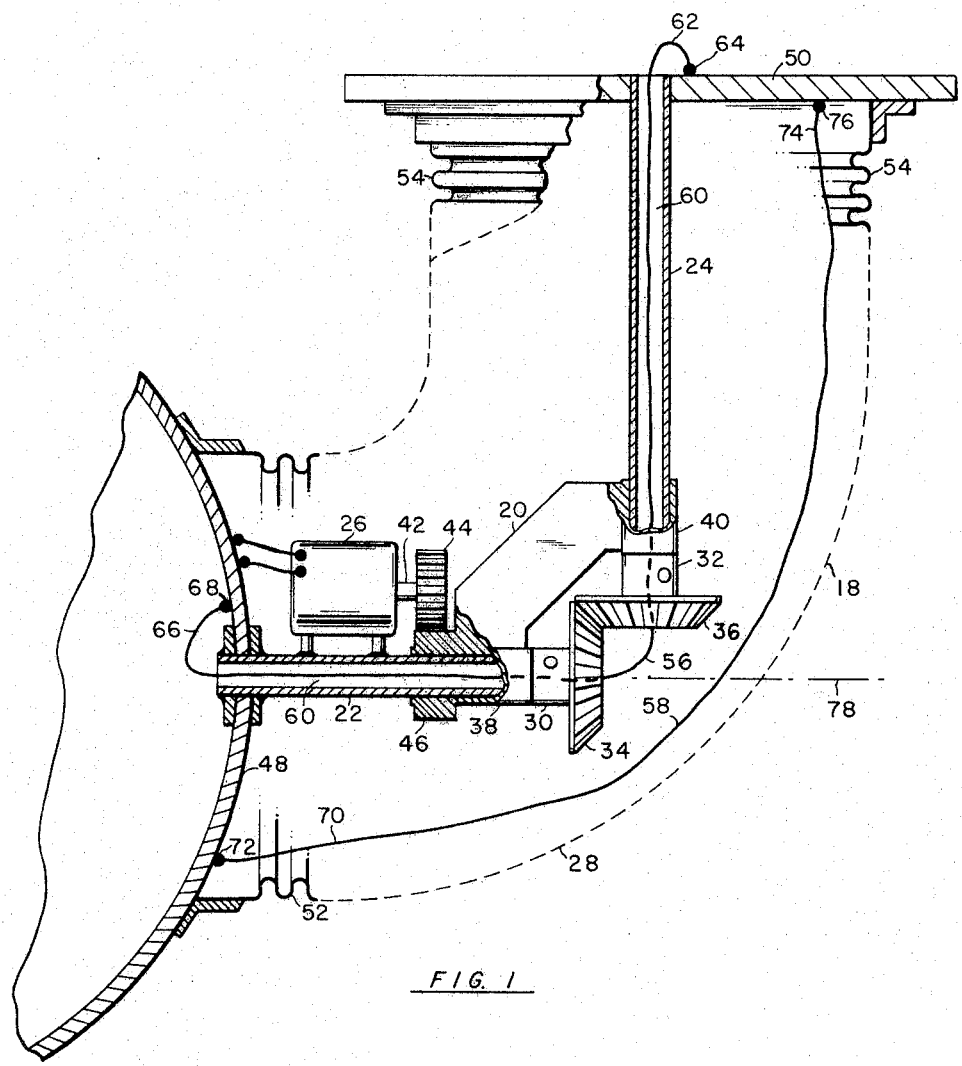

Dec. 12, 1967    E. H. WRENCH    3,358,072
COUPLING

Filed Aug. 3, 1964    2 Sheets-Sheet 1

INVENTOR.
Edwin H. Wrench
BY
Fulwider, Patton, Rieber, Lee & Utecht
ATTORNEYS

Dec. 12, 1967  E. H. WRENCH  3,358,072
COUPLING
Filed Aug. 3, 1964  2 Sheets-Sheet 2

INVENTOR.
Edwin H. Wrench
BY
Fulwider, Patton, Rieber, Lee & Utecht
ATTORNEYS

United States Patent Office 3,358,072
Patented Dec. 12, 1967

3,358,072
COUPLING
Edwin H. Wrench, 411 Archer St., La Jolla, Calif. 92037
Filed Aug. 3, 1964, Ser. No. 386,899
6 Claims. (Cl. 174—86)

The present invention relates to a coupling which permits the connection of a flexible conductor means from a fixed point to a rotating body.

The principal embodiment comprises a plurality of straight tubes. A plurality of interconnecting means connect the tubes in non-closing end to end relationship in such a manner that if one of the two end tubes is not rotating about its longitudinal axis and the remaining end tube is rotated about its longitudinal axis, an observer proceeding from one end to the other along the axes of the interconnecting tubes, would see all the tubes, except the end tube which is not rotating about its longitudinal axis, rotating in the same direction at the same rate about their respective longitudinal axes. A plurality of elongated flexible conducting means extend through the plurality of tubes and their associated interconnecting means. The ends of the flexible conducting means which emerge from the tube which is not rotating about its longitudinal axis, is fixed in relation to the nonrotating end tube.

Other features and the advantages of the present invention will be apparent from the following description, reference being had to the accompanying drawings wherein preferred embodiments of the invention are illustrated.

Figure 2:
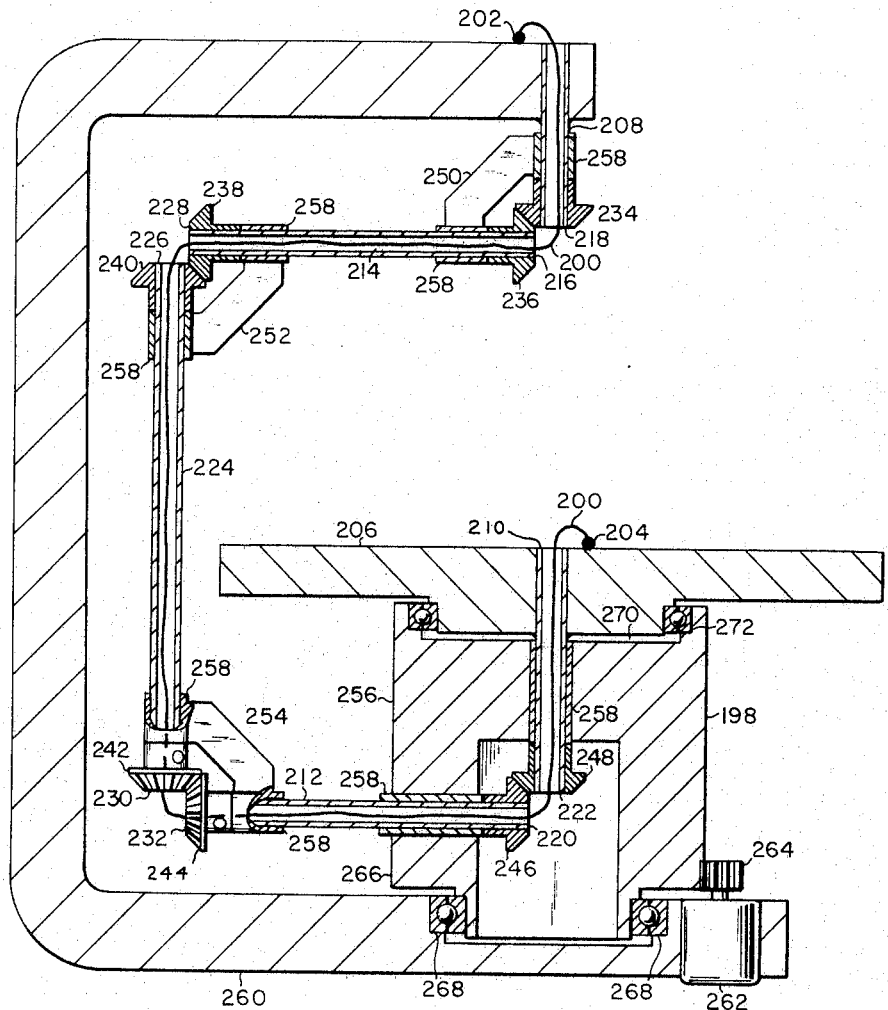

In the drawings:

FIG. 1 is a view partly in cross-section if a coupling with a single interconnecting means; and FIG. 2 is a view partly in cross-section of a coupling with a plurality of interconnecting means.

FIG. 1 shows a coupling 18 with a single supporting and interconnecting means 20 for shafts 22 and 24, prime mover means 26 and encompassing means 28. In this figure the longitudinal axes if shafts 22 and 24 intersect at right angles. The ends 30 and 32 of the shafts 22 and 24, respectively, which are adjacent the point of intersection of said axes, have intermeshing one to one ratio bevel gears 34 and 36, respectively, attached thereto.

The interconnecting means 20 is rotatably connected to shafts 22 and 24 by bearings 38 and 40, respectively. This connection being such that the shafts are free to rotate about their longitudinal axes. Prime mover means 26 is affixed to shaft 22 and drives shaft 42 to which gear 44 is affixed. Gear 44 in turn drives gear 46 which is an integral part of the interconnecting means 20.

Shaft 22 is fixed to base 48 and shaft 24 is fixed to platform 50. Encompassing means 28 encompasses all the aforementioned parts except the base 48 and platform 50 and is attached at end 52 to base 48 and at end 54 to platform 50. In this case the encompassing means is a flexible bellows. The presence of the encompassing means permits one to control the fluid in which the coupling is to operate (e.g., inert gas or lubricating fluid). This feature is particularly important in applications where a vacuum exists exteriorly of the encompassing means. This importance arises because it is extremely difficult to lubricate moving parts in a vacuum.

The principal purpose of coupling 18 is to permit the connection of flexible conducting means 56 or 58 at one end to base 48 and at the other end to platform 50. Flexible conducting means 56 passes through the hollow portions 60 of shafts 22 and 24; it is fixed at end 62 to platform 50 at 64 and is fixed at end 66 to base 48 at 68. Flexible conducting means 58 passes exteriorly of shafts 22 and 24 and interiorly of encompassing means 28 and is attached at end 70 to base 48 at 72 and is attached at end 74 to platform 50 at 76. An explanation of how this type of connection is possible is given below along with the explanation of the modes of operation.

There are two modes of operating coupling 18 of FIG. 1. One mode is to rotate base 48 about axis 78 (i.e., the centerline of shaft 22), which rotation also causes shaft 22 to rotate about said axis. At the same time the prime mover means rotates about interconnecting means 20 and shaft 22 at the same rate the base 48 and shaft 22 are being rotated but in the opposite direction so as to prevent movement of the interconnecting means 20. The result of such a mode of operation is that shaft 24, though it rotates about its own longitudinal axis, always has its longitudinal axis pointing in the same direction. Such a mode of operation is particularly useful in the operation of a satellite where it is required that a fixture attached to the satellite always points at a point in space (e.g., the sun) in spite of the fact that satellite is itself spinning about an axis. In FIG. 1 the base 48 would be a portion of a satellite which is rotating about axis 78 and rotating platform 50 would be in a plane which is normal to a line directed to a point in space (e.g., the sun).

In this first mentioned mode of operation, the flexible conductor means 56 or 58 is prevented from twisting because the coupling 18 causes both ends of the conductor means 56 or 58 to rotate at the same rate with respect to the axes of rotation of their associated shafts 22 or 24.

A second mode of operating the coupling would be to hold base 48 and shaft 22 fixed while the prime mover means rotates the interconnecting means 20 about axis 78 and rotates shaft 24 in a plane and about axis 78. As shaft 24 rotates in a plane and about axis 78, the bevel gears 34 and 36 cause shaft 24 to rotate about its longitudinal axis.

In this second mode of operation threads 68 and 72, of the conducting means 56 and 58, respectively, are held fixed while the other ends 64 and 76 rotate in circles about axis 78. This rotation causes the flexible conducting means 56 and 58 to flex and in so doing causes the ends 64 and 76 to rotate with respect to the longitudinal axis of flexible conducting means 56 and 58, respectively. The rotation of the ends 64 and 76 with respect to the longitudinal axis of the conducting means would produce cumulative torque in the conducting means, but the torque does not accumulate because the coupling 18 causes ends 64 and 76 to rotate about the longitudinal axis of tube 24.

FIG. 2 illustrates the solution of the classical problem of running a flexible conducting means 200 from a fixed point 202 to a fixed point 204 on a rotating platform 206. Coupling 198 accomplishes this result without producing any cumulative torque in the conducting means 200.

Coupling 198 utilizes two end tubes 208 and 210 whose longitudinal axes lie along the axis of rotation of platform 206. End tube 208 is fixed with respect to said axis of rotation and said fixed point. End tube 210 is rotatable about said axis of rotation and is fixed to platform 206.

Two interconnecting tubes 212 and 214, having the same length, each have their longitudinal axes respectively lying in a plane that is perpendicular to said axis of rotation. Interconnecting tube 214 has end 216 in proximity to the axis of rotation and end 218 of end tube 208. Interconnecting tube 212 having end 220 in proximity to said axis of rotation and end 222 of end tube 210. The longitudinal axes of both interconnecting tubes lie in a plane which passes through said axis of rotation.

Coupling 198 further comprises a joining tube 224 whose longitudinal axis lies in the plane defined by the longitudinal axes of the interconnecting tubes 212 and 214 and is parallel to said axis of rotation. End 226 of tube 224 is in proximity to the outwardly end 228 of tube 214. End 230 of tube 224 is in proximity to the outwardly end 232 of tube 212.

Bevel gears 234, 236, 238, 240, 242, 244, 246 and 248 are attached to and fit over the following tube ends, 218, 216, 228, 226, 230, 232, 220 and 222, respectively. The interiors of the tubes are not obstructed by the presence of the bevel gears. The following pairs of bevel gears intermesh and have a one to one gear ratio, 234 and 236, 238 and 240, 242 and 244, and 246 and 248.

Interconnecting means 250, 252, 254 and 256 interconnect the following pairs of tubes; 208 and 214, 214 and 224, 224 and 212, and 212 and 210. Each tube is rotatably connected to its associated interconnecting means by bearing means 258.

Interconnecting means 256 is rotatably connected by bearing means 268 to a fixture 260 for rotation about said axis of rotation.

The motor 262 is affixed to 260 and through its associated gear 264 causes the interconnecting means 256 to rotate about the axis of rotation. The rotation causes the longitudinal axes of the interconnecting tubes 212 and 214 to rotate in planes that are perpendicular to said axis of rotation, causes the interconnecting tubes 212 and 214 to rotate about their longitudinal axes, causes the longitudinal axis of the adjoining tube 224 to rotate about said axis of rotation, causes the rotating end tube 210 to rotate and causes platform 206 to rotate. This rotation is made possible by the fact that interconnecting means 256 has a peripheral row of gear teeth 266. Row 266 is disposed around a circle whose center coincides with said axis of rotation. Gear 264 intermeshes with the teeth of row 266.

FIGURE 2 shows the upper surface 270 of interconnecting means 256 adjacent platform 206 and shows bearing means 272 between platform 206 and interconnecting means 256. Bearing 272 adds to the stability of platform 206 but is not essential to its operation.

Fixture 260 is connected to end tube 208.

There are many conductor means that could be used, for example, flexible fluid, light and mechanical motion conductors could be used. For illustration purpose, I have elected to show the conductor means as electrical wires 56, 58 and 200.

Through the drawings disclose only two embodiments there are many other possible embodiments. A very natural application of the coupling would be in connecting conductor means from a fixed point to a stable platform which is supported by a plurality of gimbals. The conductor could be run through a series of tubes in a manner similar to that shown in FIG. 2.

The present invention though simple in nature solves coupling problems which were formerly inadequately solved. For example, the classic problem of making an electrical connection from a fixed base to a rotating platform has been previously solved by the use of slip-rings. Since the slip-ring solution relies on contacting surfaces which move relative to one another, it has some undesirable operating characteristics which are not present in the single piece electrical conductor solution of the present application. In particular, slipping contact surfaces have problems involving electrical arcing, noise and power loss, and wear.

While the forms of embodiment herein shown and described constitute preferred forms, it is understood that other forms may be adapted falling within the scope of the claims that follow:

I claim:
1. In combination:
    (A) a conductor;
    (B) a coupling including two bodies carrying the conductor;
    (C) means for supporting one of the bodies rotatably with respect to the other body;
    (D) gearing supported by the means (C) and connecting the bodies including:
        (1) a gear fixed on one of the bodies;
        (2) a gear fixed on the other body, the axes of the gears being at angles with respect to one another, said gears having one to one ratio;
    (E) and means for preventing rotation of the supporting means about the axis of the gear on the rotatable body when rotation is imparted to the rotatable body relative to the other body.

2. A combination as defined in claim 1, characterized in that one of the gears is fixed to its respective body by a hollow support whose axis is common with that of said one gear, and that the conductor extends through the hollow support.

3. A combination as defined in claim 1, characterized in that the gears are fixed to their respective bodies by hollow supports whose axes are common with the respective gears, and that the conductor extends through the hollow supports.

4. A combination as defined in claim 1, characterized in that one end of the conductor is fixed to one of the bodies and the other end is fixed to the other body.

5. A combination as defined in claim 1, characterized in that the means (E) comprises:
    (1) a motor fixed to one of the bodies;
    (2) gearing connecting the motor and the supporting means (C).

6. A combination as defined in claim 1, characterized in that the angle of the axes of the gears, with respect to one another, is less than one hundred and eighty degrees.

References Cited

UNITED STATES PATENTS 2,666,188   1/1954   Klein _____ 174—86 X

DARRELL L. CLAY, *Primary Examiner.*

UNITED STATES PATENT OFFICE
CERTIFICATE OF CORRECTION

Patent No. 3,358,072                          December 12, 1967

Edwin H. Wrench

It is hereby certified that error appears in the above numbered patent requiring correction and that the said Letters Patent should read as corrected below.

Column 1, lines 31 and 38, for "if", each occurrence, read -- of --; column 3, line 16, after "to" insert -- fixture --; line 18, for "The" read -- This --.

Signed and sealed this 10th day of December 1968.

(SEAL)
Attest:

Edward M. Fletcher, Jr.                          EDWARD J. BRENNER
Attesting Officer                                  Commissioner of Patents